US012210685B2

(12) United States Patent
Nordfors et al.

(10) Patent No.: US 12,210,685 B2
(45) Date of Patent: Jan. 28, 2025

(54) HAPTIC FEEDBACK SOLUTION FOR ONE OR MORE ELEVATOR SYSTEMS

(71) Applicant: KONE Corporation, Helsinki (FI)

(72) Inventors: Jonas Nordfors, Helsinki (FI); Atif Malik, Helsinki (FI)

(73) Assignee: KONE CORPORATION, Helsinki (FI)

( * ) Notice: Subject to any disclaimer, the term of this patent is extended or adjusted under 35 U.S.C. 154(b) by 373 days.

(21) Appl. No.: 17/690,209

(22) Filed: Mar. 9, 2022

(65) Prior Publication Data

US 2022/0197390 A1 Jun. 23, 2022

Related U.S. Application Data

(63) Continuation of application No. PCT/FI2019/050831, filed on Nov. 20, 2019.

(51) Int. Cl.
| | |
|---|---|
| *G06F 3/01* | (2006.01) |
| *B66B 1/46* | (2006.01) |
| *B66B 3/00* | (2006.01) |
| *G06F 3/044* | (2006.01) |

(52) U.S. Cl.
CPC ............. *G06F 3/016* (2013.01); *B66B 1/463* (2013.01); *B66B 3/002* (2013.01); *G06F 3/0447* (2019.05); *G06F 2203/014* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 10,691,397 | B1* | 6/2020 | Clements | G06F 3/0484 |
| 10,732,721 | B1* | 8/2020 | Clements | B66B 1/468 |
| 11,331,938 | B1* | 5/2022 | Kaplan | G09B 21/005 |
| 2015/0145676 | A1* | 5/2015 | Adhikari | A61B 5/1123 |
| | | | | 340/539.32 |
| 2015/0232300 | A1* | 8/2015 | Preston | B66B 1/468 |
| | | | | 187/395 |
| 2017/0355557 | A1* | 12/2017 | Witczak | B66B 9/00 |
| 2018/0127234 | A1 | 5/2018 | Lofberg et al. | |
| 2019/0221031 | A1* | 7/2019 | de la Carcova | A63J 5/02 |
| 2019/0284020 | A1* | 9/2019 | Gireddy | B66B 1/468 |

FOREIGN PATENT DOCUMENTS

| | | |
|---|---|---|
| JP | 2013-56732 A | 3/2013 |
| WO | WO 2015/169351 A1 | 11/2015 |

OTHER PUBLICATIONS

International Search Report, issued in PCT/FI2019/050831, dated Aug. 31, 2020.
Written Opinion of the International Searching Authority, issued in PCT/FI2019/050831, dated Aug. 31, 2020.

* cited by examiner

*Primary Examiner* — Toan H Vu

(74) *Attorney, Agent, or Firm* — Birch, Stewart, Kolasch & Birch, LLP

(57) ABSTRACT

A method for a haptic feedback system for one or more elevator systems includes detecting a user indication provided via a user interface device of one of the one or more elevator systems, receiving at least one status information, and generating a haptic output signal via the user interface device in accordance with the at least one status information. A control unit, a haptic feedback system and a computer program performing at least part of the method is disclosed.

20 Claims, 3 Drawing Sheets

HAPTIC FEEDBACK SOLUTION FOR ONE OR MORE ELEVATOR SYSTEMS

CROSS REFERENCE TO RELATED APPLICATIONS

This application is a Continuation of PCT International Application No. PCT/FI2019/050831, filed on Nov. 20, 2019, which is hereby expressly incorporated by reference into the present application.

TECHNICAL FIELD

The invention concerns in general the technical field of elevators. Especially the invention concerns user interface devices for the elevators.

BACKGROUND

Typically, elevator systems may have several user interface devices, which enable interaction of users, such as passengers, with the elevator system. The user interface devices are typically one residing in an elevator car, such as a car operating panel, and another residing at landing floor, such as a landing call panel. The user interface devices may comprise input devices, such as buttons and similar, for requesting a service from the elevator system. The requested service may e.g. refer to requesting a transportation from the elevator system, requesting opening/closing of doors, requesting a communication connection to contact center, indicating an emergency situation and so on.

In modern elevator systems touch devices, such as touchscreens, replace panels with physical input devices. The touch devices may further provide haptic output, which may be detectable at least by the user.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a control unit, a haptic feedback system, and a computer program for one or more elevator systems. Another objective of the invention is that the method, the control unit, the haptic feedback system, and the computer program for one or more elevator systems enable dynamical control of haptic feedback of user interface devices.

The objectives of the invention are reached by a method, a control unit, a haptic feedback system, and a computer program as defined by the respective independent claims.

According to a first aspect, a method for a haptic feedback system for one or more elevator systems is provided, wherein the method comprising: detecting a user indication provided via a user interface device of one of the one or more elevator systems, receiving at least one status information, and generating a haptic output signal via the user interface device in accordance with the at least one status information.

The generated haptic output signal may comprise status-specific one or more characteristics.

The one or more characteristics of the haptic output signal may comprise: amplitude, duration, and/or pattern.

The at least one status information may comprise: a status of a building, where the elevator system comprising the user interface device resides; a status of a user of the user interface device; a status of the user interface device; and/or a theme-based status.

Furthermore, the status of the building may depend on type of the building, destination floor type, destination floor number, or time of the day.

Alternatively or in addition, the status of the user may be detected based on data received from at least one sensor device arranged in a vicinity of the user interface device and/or by using access control.

Alternatively or in addition, the status of the user interface device may be detected based on data received from at least one sensor of touch-based input devices of the one or more user interface devices arranged to detect strength received by the touch-based input devices.

According to a second aspect, a control unit of a haptic feedback system for one or more elevator systems is provided, wherein the control unit is configured to: detect a user indication provided via a user interface device of one of the one or more elevator systems, receive at least one status information, and generate a haptic output signal via the user interface device in accordance with the at least one status information.

The generated haptic output signal may comprise status-specific one or more characteristics.

The one or more characteristics of the haptic output signal may comprise: amplitude, duration, and/or pattern.

The at least one status information may comprise: a status of a building, where the elevator system comprising the user interface device resides; a status of a user of the user interface device; a status of the user interface device; and/or a theme-based status.

Furthermore, the status of the building may depend on type of the building, destination floor type, destination floor number, or time of the day.

Alternatively or in addition, the status of the user may be detected based on data received from at least one sensor device arranged in a vicinity of the user interface device and/or by using access control.

Alternatively or in addition, the status of the user interface device may be detected based on data received from at least one sensor of touch-based input devices of the one or more user interface devices arranged to detect strength received by the touch-based input devices.

According to a third aspect, a haptic feedback system for one or more elevator systems is provided, wherein the haptic feedback system comprises: one or more user interface devices of the one or more elevator system, and a control unit described above.

The one or more user interface devices may be arranged to at least one of the following: an elevator car, a surface of a building where the elevator system comprising the one or more user interface devices resides.

According to fifth aspect, a computer program is provided, wherein the computer program, when executed by at least one processor, cause a control unit of a haptic feedback system to perform the method described above.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1A:
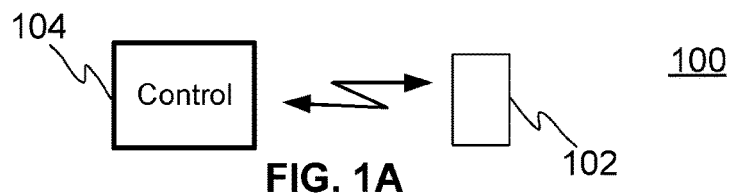
FIG. 1A illustrates schematically an example of a haptic feedback system according to an embodiment of the invention.
Figure 1B:
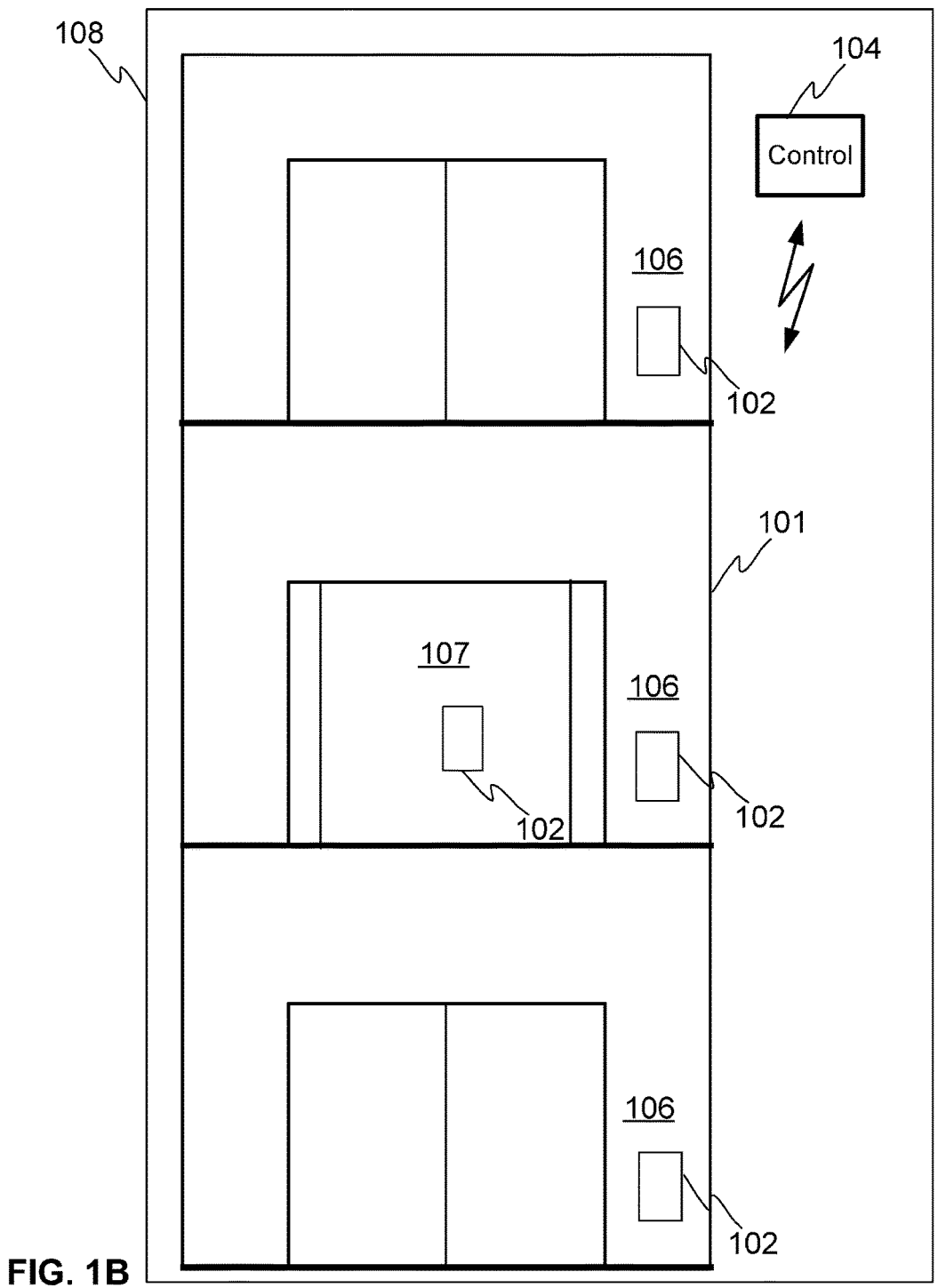
FIGS. 1B and 1C illustrate schematically non-limiting examples of an elevator system in which the haptic feedback system according to an embodiment of the invention may be arranged.
Figure 1C:
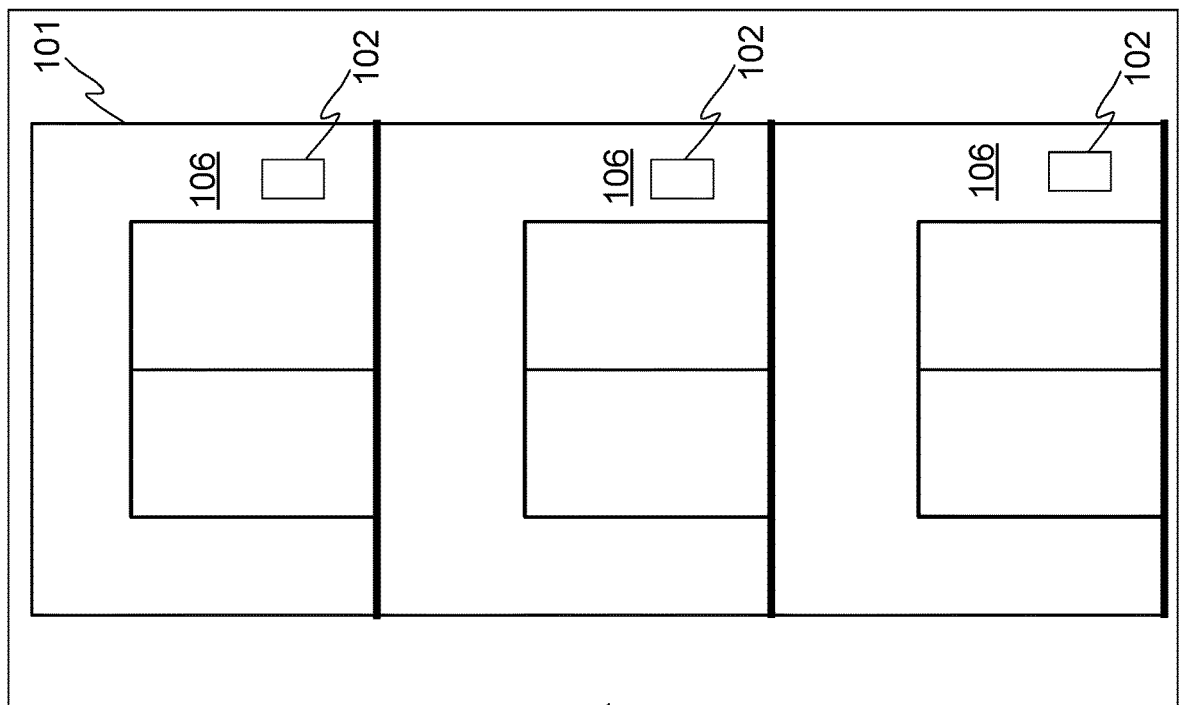
Figure 1C:
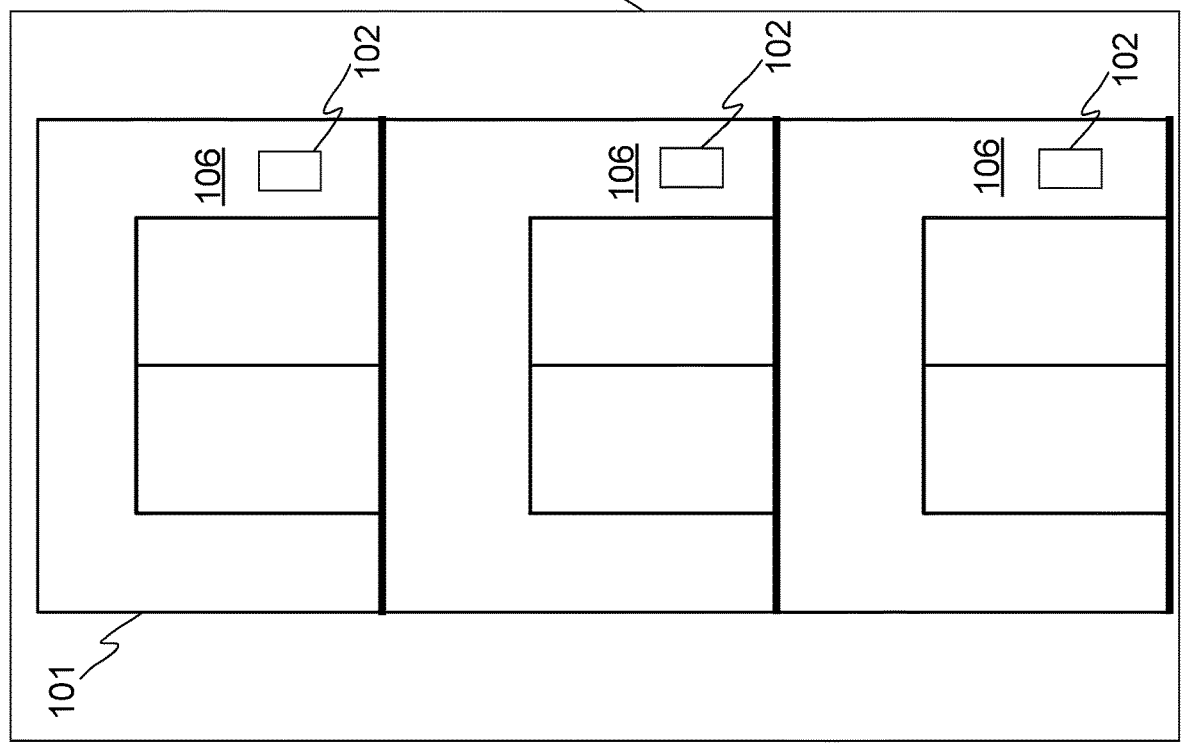

FIG. 1A illustrates schematically an example of a haptic feedback system 100 according to an embodiment of the invention. The haptic feedback system 100 may comprise one or more user interface devices 102 of one or more elevator system 101 and a control unit 104 for providing dynamic haptic feedback for a user of the one or more user interface devices 102. At least some aspects of embodiments according to the present invention may be described, at least in partly, by referring to FIGS. 1B and 1C. FIGS. 1B and 1C illustrate non-limiting examples of one or more elevator systems 101 in which a haptic feedback system comprising the one or more user interface devices 102 of the one or more elevator system 101 and the control unit 104 may be arranged. The one or more user interface devices 102 may be arranged to a surface 106 of a building 108, such as to a wall, or a surface 107 of an elevator car, such as to one of the side walls. The previous are non-limiting examples of the surfaces into which the user interface devices 102 may be implemented. In the example of FIG. 1B the elevator car has arrived at the middle floor and door(s) of the elevator car and the landing door(s) at the middle floor are open in order to expose view inside the elevator car. The user interface device 102 arranged to the elevator car may be for example a car operating panel. The user interface device 102 arranged to a surface 106 of the building 108 may be for example a hall operating panel or a landing call panel.

In the example of FIG. 1B one building 108 comprises one elevator system 101 and the haptic feedback system 100 may be implemented in this one elevator system 101 for providing dynamic haptic feedback for the user of the one or more user interface devices 102 of the elevator system 101. Alternatively, one building 108 may comprise two or more elevator systems 101 and the haptic feedback system 100 may be implemented in these two or more elevator systems 101 for providing dynamic haptic feedback for the user of the one or more user interface devices 102 of the elevator systems 101. In the example of FIG. 10 two buildings 108 comprise each one elevator system 101 and the haptic feedback system 100 may be implemented in these two elevator systems 101 residing in the two different buildings 108 for providing dynamic haptic feedback for the user of the one or more user interface devices 102 of the elevator systems 101. Alternatively, the haptic feedback system 100 may be implemented in multiple elevator systems 101 residing in one or more buildings 108 for providing dynamic haptic feedback for the user of the one or more user interface devices 102 of the elevator systems 101. The previous are non-limiting examples of the elevator systems 101 in which the haptic feedback system 100 may be implemented.

The user interface device 102 may comprise touch-based input devices, such as touch buttons, touchscreens and similar, for requesting a service from the elevator system 101 to which the user interface device 102 belongs. The requested service may e.g. refer to requesting a transportation from the elevator system 101, requesting opening/closing of doors, requesting a communication connection to contact center, indicating an emergency situation and so on. Moreover, the touch-based input devices of the user interface device 102 may be equipped with electronics, such as piezoelectric devices, e.g. piezoelectric disc, suitable for providing at least a detectable haptic output by the user. Moreover, according to some embodiments the user interface device 102 may be equipped with electronics suitable for providing any other detectable output by the user, such as a visual output or an audible output.

The control unit 104 illustrated in FIGS. 1A to 10 may be arranged to control at least in part the one or more of the user interface devices 102. The implementation of the control unit 104 may be done as a stand-alone entity or as a distributed controlling environment between a plurality of stand-alone devices, such as a plurality of servers providing distributed control resource. The communication between the control unit 104 and the one or more user interface devices 102 may be implemented in a wired manner or wirelessly at least in part. According to an embodiment of the invention, the control unit 104 may be any dedicated locally or remotely arranged control device, such as a server device, configured to perform the tasks of the control unit 104. According to another embodiment of the invention, the control unit 104 may be for example an elevator controller entity or a part of the elevator controller entity arranged to control at least in part at least some entities of one or more elevator systems 100. When the control unit 104 is implemented at least as a part of the elevator controller the feedback 100 system may be implemented in said one or more elevator systems 101 which the elevator controller controls. According to another embodiment of the invention, the control unit 104 may be an external control unit. Some non-limiting examples of the external control units may e.g. be a remote server, cloud server, computing circuit, a network of computing devices. The external unit herein means a unit that locates separate from the elevator systems 100. In FIGS. 1A to 10, the control unit 104 and the one or more user interface devices 102 are illustrated as separate units, but according to an embodiment of the invention, the control unit 104 may be included at least partly in one or more user interface devices 102. In other words, the control unit 104 may be implemented in the one or more user interface devices 102 at least in part. The implementation of the control unit 104 may be done so that the control unit 104 is included at least partly in a single user interface device 102 or the control unit 104 may be implemented as a distributed controlling environment between a plurality of user interface devices 102.

According to an embodiment of the invention, the control unit 104 may be communicatively coupled to the elevator controllers of the one or more elevator systems 100 for receiving any elevator-related data. The communication between the control unit 104 and the elevator controllers of the one or more elevator systems 100 may be implemented in a wired manner or wirelessly at least in part.

Figure 2:
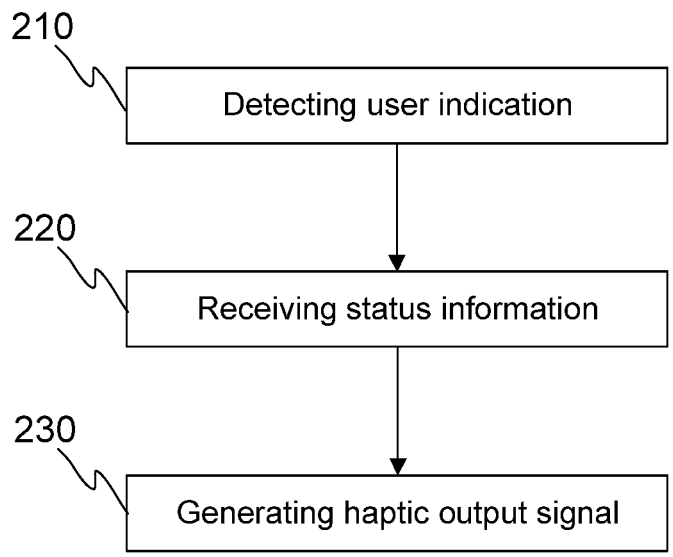
FIG. 2 illustrates schematically aspects relating to a method according to embodiments of the invention.

Now, at least some aspects of the present invention may be described by referring to FIG. 2 in which a method according to an embodiment of the present invention is schematically illustrated.

In the step 210 a user indication provided via a user interface device 102 of one of the one or more elevator systems 101 may be detected. According to an embodiment of the invention the user indication may be provided in response to a user interaction with one of the touch-based input devices of the user interface device 102. For example, in response to a detection of a touch, e.g. with a finger or any other pointer, on a touch button or touchscreen of the user interface device 102 for requesting a service from the elevator system 101 to which the user interface device 102 belongs. According to another embodiment of the invention the user interface device 102 may be equipped with one or more proximity sensors and the user indication may be provided in response to a detection, by the one or more proximity sensors, of an object, such as the user, in a vicinity of the user interface device 102, i.e. within an operational area of the one or more proximity sensors.

In the step 220 at least one status information may be received. The at least one status information may be received in response to the detection of the user indication. The at least one status information may be received from a memory of the control unit 104, one or more sensor devices, any external entity and/or any database.

According to an embodiment of the invention, the at least one status information may comprise a status of the building 108, where the elevator system 101 comprising the user interface device 102 resides. The status of the building 108 may depend on type of the building 108. Non-limiting examples of different types of the buildings 108 may be residential building, office building hospital, retirement home, library, hotel, shopping mall, and so on. The status of the building 108 depending on the type of the building 108 may be predefined or selected during configuration of the elevator system 101 in the building 108. The predefined or selected status of the building 108 depending on the type of the building 108 may be stored into the memory of the control unit 104 and/or provided for storing in any external entity or database. Alternatively or in addition, the status of the building 108 depending on the type of the building 108 may be adjusted, i.e. changed during the use of the elevator system 101. For example, if the purpose of the use of the building 108 is changed from one type to another type, a new status of the building 108 depending on the type of the building 108 may be redefined and stored into the memory of the control unit 104 and/or provided for storing in any external entity or database.

Moreover, the status of the building 108 may depend on destination floor type. Non-limiting examples of different types of destination floor may be spa, movie theatre, office and so on. The status of the building 108 depending on the type of the destination floor may be predefined or selected during configuration of the elevator system 101 in the building 108. The predefined or selected status of the building depending on the type of the destination floor may be stored into the memory of the control unit 104 and/or provided for storing in any external entity or database. Alternatively or in addition, the status of the building 108 depending on the type of the destination floor may be adjusted, i.e. changed during the use of the elevator system 101. For example, if the purpose of the use of the floor is changed from one type to another type, a new status of the building depending on the type of the destination floor may be redefined and stored into the memory of the control unit 104 and/or provided for storing in an external entity or database.

Moreover, the status of the building 108 may depend on destination floor number. In other words, each floor of the building 108 may have its own status.

Moreover, the status of the building 108 may depend on time of the day. In other words, each time of the day may have its own status. The control unit 104 may be aware of the time of the day or the control unit 104 may receive information indicating the time of the day from an external entity.

According to another embodiment of the invention, the at least one status information may alternatively or in addition comprise a status of a user of the user interface device 102 from via the detected user indication is provided. According to an embodiment of the invention the haptic feedback system 100 may further comprise at least one sensor device, such as optical imaging device, e.g. a camera, arranged in a vicinity of the user interface devices 102. The at least one sensor device may be arranged in a vicinity of one or more user interface devices 102 so that the least one sensor device may detect the users of the user interface devices 102, i.e. within an operational area of the at least one sensor device. The status of the user may be detected, i.e. recognized, based on data received from the at least one sensor device. According to another embodiment of the invention, the haptic feedback system 100 may alternatively or in addition use access control to detect, i.e. recognize, the status of the user. The access control may be based on using keycards; tags; identification codes; such as personal identity number (PIN) code, ID number; and/or biometric technologies, such as fingerprint, facial recognition, iris recognition, retinal scan, voice recognition, and so on. The haptic feedback system 100 may be equipped with one or more devices arranged to provide the access control-based recognition of the status of the user. Alternatively, the status of the user may be detected, i.e. recognized, based on data received from an access control system of the one or more elevator systems 101 to which the haptic feedback system 100 may be communicatively coupled in a wired manner or wirelessly. The status of the user may depend on, but is not limited to, age, disabilities, position, and so on.

According to another embodiment of the invention, the at least one status information may alternatively or in addition comprise a status of the user interface device 102. The status of the user interface device 102 may be derived from data received from the user interface device 102. The touch-based input devices of the one or more user interface devices 102 may detect strength received by the touch-based input devices, e.g. due to a touch, e.g. with a finger or any other pointer, on the touch-based input devices of the user interface devices 102. For example, the touch-based input devices of the one or more user interface devices 102 may each comprise at least one sensor device arranged to detect the strength received by the touch-based input devices by detecting the amount of bending of the touch-based input devices due to the touch, e.g. with a finger or any other pointer. The at least one sensor device may be for example, but not limited to, capacitive sensor, inductive sensor, electromagnetic sensor, resistive sensor, piezoresistive sensor, piezoelectric sensor, optical sensor, or resonance-based sensor. Preferably, the at least one sensor device may be a piezoelectric sensor, e.g. a piezoelectric disc, and the same piezoelectric disc may be used also for providing the haptic output signal. This reduces the number of needed components. The detected strengths by the at least one sensor device may be stored into the memory of the control unit 104 and/or provided for storing in an external entity or database. According to an embodiment of the invention, the detected strengths by the at least one sensor device may be used for condition-based monitoring of the operation of the touch-based input devices and/or for diagnostics of the touch-based input devices. For example, if in the monitoring and/or diagnostics is detected that greater strength is received by one or more touch-based input devices, it may be an indication that said one or more touch-based input devices may more likely fail earlier than the other touch-based input devices. These said one or more touch-based input devices may be replaced with new touch-based input device even before failing of the touch-based input devices. Thus, this enables also a preventative maintenance. According to another embodiment of the invention, the detected strengths may be used for adjusting an activation force required for the one or more touch-based input devices. For example, if it is detected that greater strength is received by one or more touch-based input devices, the activation force required for said one or more touch-based input devices may be adjusted, e.g. reduced. This may improve the lifetime of the touch-based input devices and/or prevent at least partly early failures of the touch-based input devices.

According to another embodiment of the invention, the at least one status information may alternatively or in addition comprise a theme-based status. The theme-based status may be derived from data received from an external entity, such as a content-management system, an infotainment system, any other external system, or database. The control unit 104 may be communicatively coupled to the external entity for receiving data indicating the theme-based status from the external entity and have at least some form of access to the external entity. The communication between the control unit 104 and the external entity may be implemented in a wired manner or wirelessly at least in part. Alternatively, the theme-based status may be manually indicated. The theme-based status may depend on for example, but not limited to, a visual advertisement displayed on one or more screens, such as info screens, of the building 108, where the elevator system 101 comprising the user interface device 102 resides.

In the step 230 a haptic output signal via the user interface device 102 may be generated in accordance with the received at least one status information. The haptic output signal may be for example vibration type output signal or any other tactile output signal detectable by the user. The generated haptic output signal may comprise status-specific one or more characteristics. In other words, at least some of the at least one status information may comprise a specific haptic output signal of the user interface devices 102, which may be distinguished from other of the at least one status information. The one or more characteristics of the haptic output signal may comprise: amplitude, duration, and/or pattern. The amplitude of the haptic output signal may define the strength or intensity of the haptic output signal, i.e. the haptic feedback. Some non-limiting examples of different patterns of the haptic output signal may be continuous, pulsed, buzz, wave, or any other suitable pattern. The pulsed haptic output signal may have different pulse widths and/or amplitudes. Some non-limiting examples of the haptic output signal with status-specific one or more characteristics may be: strong, soft, calm, smooth, relaxing, definite, sharp, fast, wave, click, pulsed, and so on.

Next, at least some aspects of the present invention are described by referring to non-limiting example cases for the haptic feedback solution.

According to a non-limiting example, if the at least one status information comprises the status of the building 108, e.g. the type of the building 108, a haptic output signal comprising characteristics indicating calm and/or relaxing haptic feedback may be generated for example, but not limited to, in libraries or high end hotels. While, a haptic output signal comprising characteristics indicating strong haptic feedback may be generated for example, but not limited to, in hospitals, retirement homes, or other buildings where people with disabilities may be frequent.

According to another non-limiting example, if the at least one status information comprises the status of the building 108, e.g. the type of the destination floor, a haptic output signal comprising characteristics indicating calm haptic feedback, e.g. a wave-type feedback, may be generated for example, but not limited to, for destination floor being a spa floor.

According to another non-limiting example, if the at least one status information comprises the status of the building 108, e.g. the destination floor number, a haptic output signal comprising characteristics indicating a number of for example, but not limited to, clicks or similar, corresponding to the destination floor number. For example, if the destination floor is fifth floor, the haptic output signal comprises five clicks.

According to another non-limiting example, if the at least one status information comprises the status of the building 108, e.g. the time of the day, a haptic output signal comprising characteristics indicating calm and/or relaxing haptic feedback may be generated for example, but not limited to, during rush-hour times, e.g. during morning or afternoon. While a haptic output signal comprising characteristics indicating fast or quick pulsed haptic feedback may be generated for example, but not limited to, during non-rush-hour times. This may improve the user experience by making the elevator ride more comfortable.

According to another non-limiting example, if the at least one status information comprises the status of the user of the user interface device 102, a haptic output signal comprising characteristics indicating strong and/or definite haptic feedback may be generated for example, but not limited to, for elderly people or people with disabilities. While a haptic output signal comprising characteristics indicating softer haptic feedback may be generated for others.

According to another non-limiting example, if the at least one status information comprises the status of the user interface device 102, a haptic output signal comprising characteristics indicating strong and/or definite pulsed haptic feedback may be generated in order to indicate too much strength directed to the touch-based input device.

According to another non-limiting example, if the at least one status information comprises the theme-based status, a haptic output signal comprising characteristics indicating strong and/or sharp haptic feedback may be generated for example, but not limited to, when an action movie is advertised on one or more screens of the building 108. While a haptic output signal comprising characteristics indicating calm and/or smooth haptic feedback may be generated for example, but not limited to, when a romantic drama movie is advertised on one or more screens of the building 108.

The above examples disclose example cases with one received status information. However, alternatively more than one status information may be received and the haptic output signal may be generated via the user interface device 102 in accordance with a combination of two or more status information. According to a non-limiting example, if the at least one status information comprises the status of the building 108, e.g. the destination floor number, and the status of the user of the interface device 102, a haptic output signal comprising characteristics indicating strong and/or definite number of clicks or similar corresponding to the destination floor number may be generated for example, but not limited to, for example, but not limited to, for elderly people or people with disabilities. While a haptic output signal comprising characteristics indicating softer haptic feedback may be generated for others. For example, if the destination floor is fifth floor, the haptic output signal may comprise five strong and definite clicks for elderly people. While the haptic output signal may comprise five soft and nicer, i.e. not as definite, clicks for others than elderly people.

Figure 3:
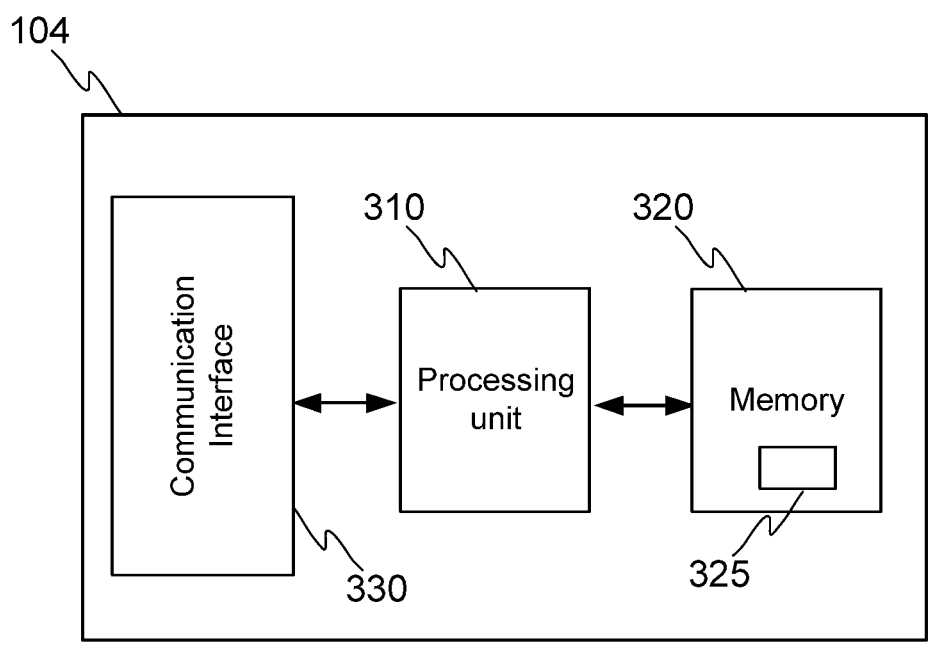
FIG. 3 illustrates schematically an example of a control unit according to an embodiment of the invention.

FIG. 3 schematically illustrates a control unit 104 according to an embodiment of the invention. The control unit 104 may comprise a processing unit 310, a memory unit 320 and a communication interface 330 among other entities. The processing unit 310, in turn, may comprise one or more processors arranged to implement one or more tasks for implementing at least part of the method steps as described. For example, the processing unit 310 may be arranged to control an operation of the one or more user interface devices 102 and any other entities of the present invention in the manner as described. The memory unit 320 may be arranged to store computer program code 325 which, when executed by the processing unit 310, cause the control unit 104 to operate as described. Moreover, the memory unit 320 may be arranged to store, as described, the at least one status information, and any other data. The communication interface 330 may be arranged to implement, e.g. under control of the processing unit 310, one or more communication protocols enabling the communication with external entities as described. The communication interface may comprise necessary hardware and software components for enabling e.g. wireless communication and/or communication in a wired manner.

The above described method, control unit 104, and haptic feedback system 100 enable dynamical control of the haptic feedback of the user interface devices 102. The dynamical control means that the haptic feedback of the user interface devices 102 may be changed or adjusted according to user-based status, building-based status, user interface device-base status, and/or theme-base status. The dynamical control of the haptic feedback of the user interface devices 102, in turn, enables customized and/or updatable haptic feedback of the user interface devices 102.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for a haptic feedback system for one or more elevator systems, the method comprising:
   detecting a user indication provided via a user interface device of one of the one or more elevator systems;
   receiving at least one status information, the at least one status information including at least one of a user-based status, a building-based status, a user interface device-based status and a theme-based status, wherein the at least one status information is independent of the user indication detected via the user interface device; and
   generating a haptic output signal via the user interface device in accordance with the at least one status information,
   wherein the haptic output signal is dynamically changed or adjusted according to at least one of the user-based status, the building-based status, the user interface device-based status and the theme-based status.

2. The method according to claim 1, wherein the generated haptic output signal comprises status-specific one or more characteristics.

3. The method according to claim 2, wherein the one or more characteristics of the haptic output signal comprises: amplitude, duration, and/or pattern.

4. The method according to claim 1, wherein the at least one status information comprises:
   a status of a building, where the elevator system comprising the user interface device resides;
   a status of a user of the user interface device;
   a status of the user interface device; and/or
   a theme-based status.

5. The method according to claim 4, wherein the status of the building depends on a type of the building, a destination floor type, a destination floor number, or a time of the day.

6. The method according to claim 4, wherein the status of the user is detected based on data received from at least one sensor device arranged in a vicinity of the user interface device and/or by using access control.

7. The method according to claim 4, wherein the status of the user interface device is detected based on data received from at least one sensor of touch-based input devices of the one or more user interface devices arranged to detect strength received by the touch-based input devices.

8. A control unit of a haptic feedback system for one or more elevator systems, the control unit including a processor, a memory and a communication interface, wherein the processor is configured to:
   detect a user indication provided via a user interface device of one of the one or more elevator systems;
   receive at least one status information, the at least one status information including at least one of a user-based status, a building-based status, a user interface device-based status and a theme-based status, wherein the at least one status information is independent of the user indication detected via the user interface device; and
   generate a haptic output signal via the user interface device in accordance with the at least one status information,
   wherein the haptic output signal is dynamically changed or adjusted according to at least one of the user-based status, the building-based status, the user interface device-based status and the theme-based status.

9. The control unit according to claim 8, wherein the generated haptic output signal comprises status-specific one or more characteristics.

10. The control unit according to claim 9, wherein the one or more characteristics of the haptic output signal comprises: amplitude, duration, and/or pattern.

11. The control unit according to claim 8, wherein the at least one status information comprises:
   a status of a building, where the elevator system comprising the user interface device resides;
   a status of a user of the user interface device;
   a status of the user interface device; and/or
   a theme-based status.

12. The control unit according to claim 11, wherein the status of the building depends on a type of the building, a destination floor type, a destination floor number, or a time of the day.

13. The control unit according to claim 11, wherein the status of the user is detected based on data received from at least one sensor device arranged in a vicinity of the user interface device and/or by using access control.

14. The control unit according to claim 11, wherein the status of the user interface device is detected based on data received from at least one sensor of touch-based input devices of the one or more user interface devices arranged to detect strength received by the touch-based input devices.

15. A haptic feedback system for one or more elevator systems, the haptic feedback system comprising:
one or more user interface devices of the one or more elevator system; and
the control unit according to claim 8.

16. The haptic feedback system according to claim 15, wherein the one or more user interface devices are arranged to at least one of the following: an elevator car, and a surface of a building where the elevator system comprising the one or more user interface devices resides.

17. A computer program embodied on a non-transitory computer readable medium which, when executed by at least one processor, causes a control unit of a haptic feedback system to perform the method according to claim 1.

18. The method according to claim 2, wherein the at least one status information comprises:
a status of a building, where the elevator system comprising the user interface device resides;
a status of a user of the user interface device;
a status of the user interface device; and/or
a theme-based status.

19. The method according to claim 3, wherein the at least one status information comprises:
a status of a building, where the elevator system comprising the user interface device resides;
a status of a user of the user interface device;
a status of the user interface device; and/or
a theme-based status.

20. The method according to claim 5, wherein the status of the user is detected based on data received from at least one sensor device arranged in a vicinity of the user interface device and/or by using access control.

* * * * *